Figure 1:
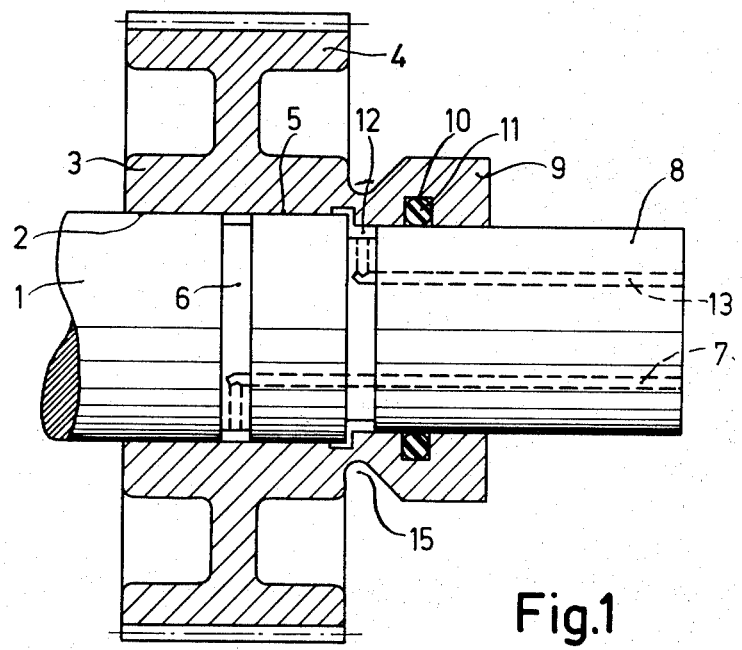

United States Patent
van Rooij

[15] 3,690,707
[45] Sept. 12, 1972

[54] CONNECTION OF TWO MEMBERS SHRUNK ON EACH OTHER

[72] Inventor: Petrus Johannes Cornelius van Rooij, Emmasingel, Eindhoven, Netherlands

[22] Filed: Nov. 23, 1970

[21] Appl. No.: 91,966

[30] Foreign Application Priority Data

Dec. 10, 1969 Netherlands..............6918492

[52] U.S. Cl. ..............................287/52 R, 287/53 R
[51] Int. Cl................................................F16d 1/06
[58] Field of Search ....................287/53, 52; 29/427

[56] References Cited

UNITED STATES PATENTS

| | | | |
|---|---|---|---|
| 3,150,571 | 9/1964 | Frassetto et al. | 92/28 |
| 2,840,399 | 6/1958 | Harless et al. | 287/53 R |
| 3,358,772 | 12/1967 | Bunyan | 287/53 R X |
| 3,228,102 | 1/1966 | Sillett | 29/427 X |
| 2,832,653 | 4/1958 | Wilson | 29/427 X |
| 2,946,610 | 7/1960 | Jenness | 287/52 R |

FOREIGN PATENTS OR APPLICATIONS

938,480 10/1963 Great Britain..............29/427

*Primary Examiner*—Andrew V. Kundrat
*Attorney*—Frank R. Trifari

[57] ABSTRACT

A shrink connection between two members in which at the area of the fitting surfaces, an annular groove is present which divides the fitting surfaces into two equal parts and communicates, via a liquid supply duct, with the atmosphere, the members on one side of the fitting surfaces comprising parts having diameters differing from the fitting surfaces, in such manner that said parts are not shrunk on each other, a flexible sealing element being present between said parts and a further liquid supply duct debouching between the relative side of the fitting surfaces and the sealing element.

4 Claims, 4 Drawing Figures

INVENTOR.
PETRUS J.C. VAN ROOIJ

AGENT

INVENTOR.
PETRUS J.C. VAN ROOIJ

BY

AGENT

CONNECTION OF TWO MEMBERS SHRUNK ON EACH OTHER

The invention relates to a connection of two members, the first member having a cylindrical fitting surface on its inner circumference which is shrunk on the second member which has a cylindrical fitting surface on its outer circumference; an annular chamber is present in one or both members at the area of said fitting surfaces, through which chamber a first liquid supply duct communicates with the atmosphere; the fitting surface parts, on either side of the chamber, have the same dimensions viewed in the axial direction.

Such a connection is known from German Pat. No. 213,421, in which liquid under pressure can be provided between the fitting surfaces through the said duct. As a result of this the shrink connection between the two members can be removed, after which the first member, for example, the hub of a toothed wheel or belt pulley, can be shifted relative to the second member, for example, a shaft. A drawback of this known connection is, however, that the liquid pressure in the chamber is maintained only until the first member has been removed from the second over such a distance that the chamber is released. At this instant the liquid disappears and the remaining part of the first member can then be removed from the second member only with great force and a possibility of damage.

In addition, a connection is known from the U.S. Pat. No. 2,926,940 in which two shrink connections are present between two members, the fitting surfaces of said members having different diameters. The liquid supply chamber is present approximately at the area of the transition in diameter between the two fitting surfaces. After supplying liquid, the fitting surfaces become disengaged from each other, after which the members can be moved or rotated relative to each other. At the same time, a certain axial force is exerted on the members by the liquid as a result of the difference in diameter, which facilitates the dismantling. A drawback of this connection, however, is that the shrink connection between the two fitting surface parts must be exactly equal since otherwise the surfaces having the lighter shrink fit are released sooner when liquid is supplied, and the fitting surfaces having the heavier shrink fit do not become disengaged. This means that the fitting surfaces have to be manufactured with a very small tolerance which makes said connection expensive.

It is the object of the invention to provide a connection of the type described above which can be manufactured in a cheap manner and in which nevertheless the two members can readily be mounted, dismantled and moved (adjusted) relative to each other.

In order to realize this object, the connection according to the invention is characterized in that the second member, on at least one of its two sides, changes into a part the outer diameter of which differs from that of the fitting surface on said member, said part being surrounded by a part of the second member having an inside diameter which is slightly larger than the outside diameter of the said part of the first member, one of the said parts comprising a groove-shaped recess in which a flexible sealing element, preferably an O-ring, can be provided, a second liquid supply duct debouching between the transition in diameter and the recess, the other end of said duct communicating with the atmosphere, the said transition in diameter being such that, viewed in the direction of mounting, the various parts of the connection show an increasing diameter.

In a further favorable embodiment, the first member comprises on its outer circumference and at the area of the transition in diameter, a groove-shaped recess which extends throughout the circumference. This has for its result, that the deformation of the part of the first member with the fitting surface is not restricted, when liquid pres-sure is exerted thereon, by the part of said member which cooperates with the flexible sealing element.

Figure 2:
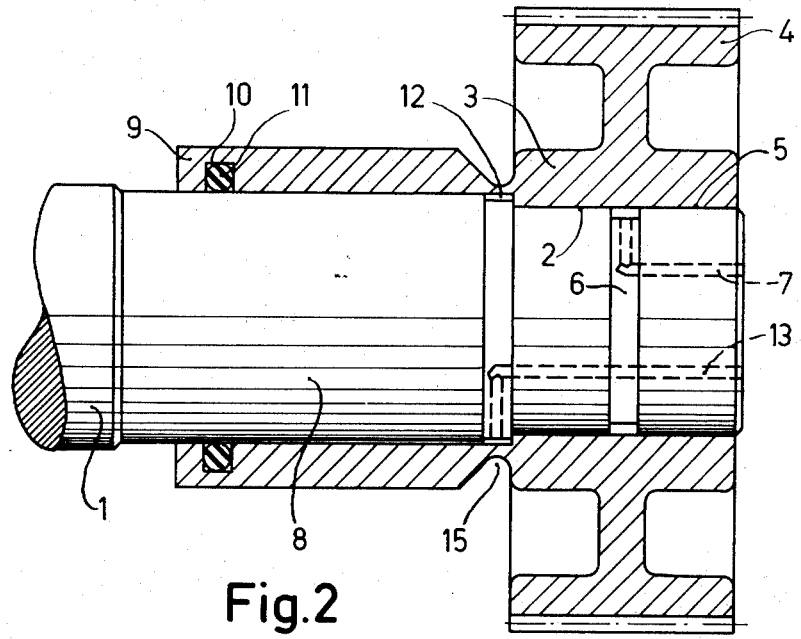

The operation and advantages of the connection according to the invention will be described in greater detail with reference to the accompanying drawings, in which:

FIGS. 1 and 2 diagrammatically show two embodiments of shrink connections.

Figure 3:
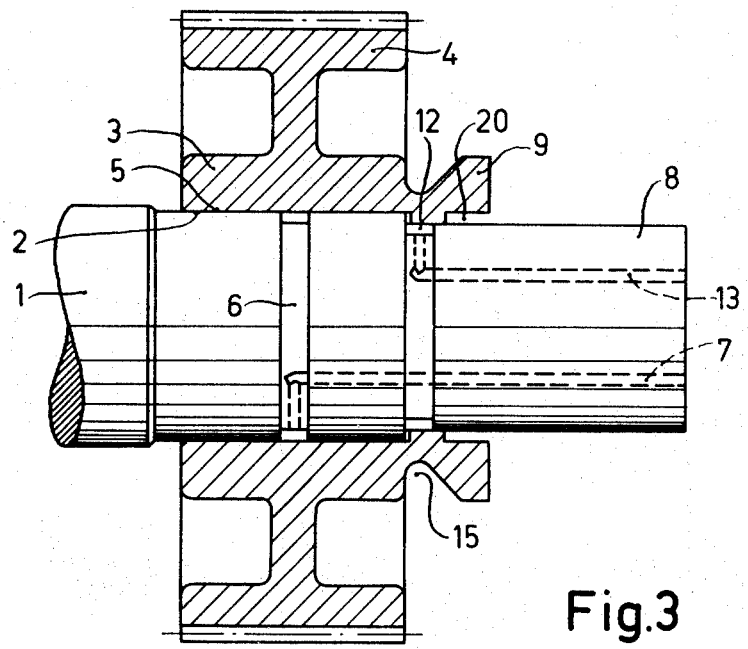
Figure 4:
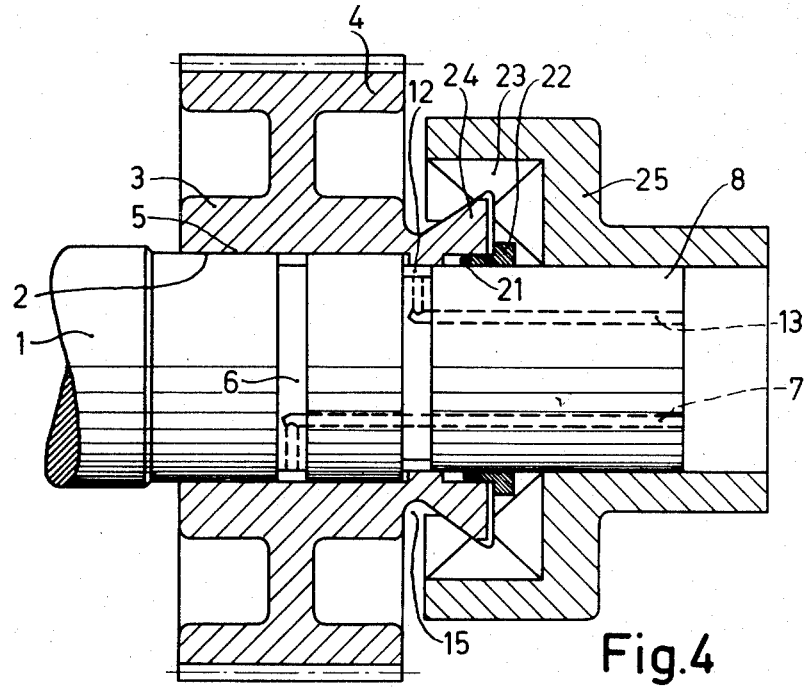

FIGS. 3 and 4 show another embodiment of a shrink connection.

Reference numeral 1 in FIG. 1 denotes a shaft comprising a fitting surface 2. The fitting surface 5 of a hub 3 of a toothed wheel 4 has been shrunk on the fitting surface 2. An annular chamber 6 is present in the fitting surface 2 and communicates with the atmosphere through a liquid supply duct 7.

The shaft 1, on one side of fitting surface 2, changes into a part 8 of a slightly smaller diameter. The part 8 is surrounded by a part 9 connected to the hub 3 which has an inside diameter which shows no shrinkage relative to the outside diameter of part 8. The part 9 includes a groove 10 in which an O-ring 11 is incorporated. Between the transition in diameter of shaft 1 to part 8 and the O-ring 11, a liquid supply duct 13 debouches in an annular chamber 12.

The ducts 7 and 13 may be connected at will to a supply for high-pressure liquid. When high-pressure liquid is supplied to duct 13, said high-pressure liquid will exert pressure on the hub 3 via the chamber 12 and will slightly deform it in such manner that the shrink connection between the fitting surfaces 2 and 5 is removed. The duct 7 is kept closed. As a result of the difference in diameter between the fitting surfaces 2,5 and the part 8, the liquid will also exert an axial force on the part 9, and hence on the hub 3 to the right, so that dismantling can take place easily. Upon mounting, liquid is supplied in the same manner to the duct 13, after which the toothed wheel can be slid the shaft manually or, if desired, by means of a collet chuck. After exhausting the liquid pressure, the fitting surfaces are shrunk on each other again. If desirable, to facilitate mounting, the hub may first be preheated.

If it is desirable to rotate the toothed wheel relative to the shaft, liquid under pressure is supplied to chamber 6 via duct 7. This chamber 6 is accommodated exactly in the center of the fitting surfaces 2 and 5. As a result of this, the hub is pumped again so that the parts of the fitting surfaces on either side of the groove are released from each other simultaneously. The duct 13 remains open so that no pressure build-up can take place in the chamber 12. The toothed wheel can now easily be rotated on the shaft. In order to prevent too large an influence of the part 9 on the deformation of the adjoining piece of the hub 3, the part 9 comprises on its circumference an annular recess 15. In this manner, there is prevention of the situation wherein the right-hand part of the hub would remain shrunk on the shaft, while the left-hand part is already free.

In this manner, by using a shrink connection in combination with an O-ring seal and two liquid supply ducts, a very easy mounting, dismantling and adjusting possibility of the toothed wheel is obtained. The fitting surfaces which are to be manufactured accurately all have the same diameters so that the cost of manufacture can be comparatively small.

FIG. 2 shows a slightly different embodiment of the shrink connection shown in FIG. 1, in which the part 9 which supports the O-ring, is provided on the other side of the hub 3. The further construction and operation of this embodiment will be obvious after the above explanation.

FIGS. 3 and 4 diagrammatically show a slightly varied construction of a shrink connection. Those parts of said connection which correspond to parts of the connection shown in FIG. 1, are referred to by the same reference numerals.

The part 9 of the hub 3 is provided with a groove-shaped recess 20 which continues on the right-hand side up to the end-face. An O-ring 21 can be provided in the said groove-shaped recess. Since during operation said O-ring as such has no function it can be taken away as is shown in FIG. 3. The advantage of this is that the O-ring does not change and is provided only when it is necessary, namely during the mounting and dismantling. If, in the situation shown in FIG. 3, liquid under pressure is supplied via the duct 7, the shrink connection between the hub 3 and the shaft 1 must be removed again after which adjustment of the hub relative to the shaft may be carried out. When the toothed wheel is to be dismantled, an O-ring 21 is provided in a recess 20. The O-ring 21 is enclosed by means of a lock ring 22. Furthermore, a divided ring 23 is provided which engages around the edge 24 of the part 9. The parts of the ring 23 are surrounded by a cylindrical structural component 25, so that the parts of ring 23 cannot move towards the outside.

If liquid is supplied via duct 13, with duct 7 closed, the hub 3 is again deformed in such manner that the shrink connection disappears while farther on the hub 3 an axial force is exerted to the right. The O-ring 21 cannot be forced out of the recess 20, since the lock ring 21 is held by ring 23. In this manner again an easy dismantling is obtained. Mounting can be carried out in the same manner.

What is claimed is:

1. A connection of two members of which the first comprises a cylindrical fitting surface on its inner circumference and is shrunk on the second member which comprises a cylindrical fitting surface on its outer circumference, an annular chamber being present in at least one of the members at the area of said fitting surfaces, through which chamber a first liquid supply duct communicates with the atmosphere, the parts of the fitting surface present on either side of the chamber having the same dimensions viewed in the axial direction, characterized in that the second member changes, on at least one of its two sides, into a part of the outside diameter of which differs from that of the fitting surface on said second member, said part being surrounded by a part of the first member having an inside diameter which is slightly larger than the outside diameter of the said part of the second member, one of the said parts comprising a groove-shaped recess in which a flexible sealing element, preferably an O-ring, can be provided, a second liquid supply duct debouching between the transition in diameter and the recess, the other end of said duct communicating with the atmosphere, the said diameter transition being such that, viewed in the direction of mounting, the various parts of the connection show an increasing diameter, and wherein said first member comprises on its outer circumference at the area of the transition in diameter a groove-shaped recess extending throughout the circumference.

2. For use with a supply of pressurized fluid, a pair of shaft and cylinder members, each having first and second axially spaced parts of different diameters to permit relative axial translation for disassembly, with a transitional area between the first and second parts of each member, the two first parts of the shaft and cylinder respectively having adjacent circumferential contact surfaces corresponding in diameter for a shrink-fit connection to each other, at least one of said contact surfaces of the two first parts formed to define a first annular chamber between said surfaces, this chamber defining axially spaced end-surfaces and radially spaced side-surfaces, and each end-surface of any one member being adjacent a corresponding end-surface only of the same member, the shaft further including an internal duct having a first opening in said contact surface thereof for communication with said chamber and a second opening connectible to said fluid supply, said two members having adjacent surfaces at said transitional area which surfaces define between them a second annular chamber having radially spaced side-surfaces and axially spaced end-surfaces, with at least one end-surface of one member being adjacent a corresponding end-surface of the other member, said shaft further including a second internal duct having a first opening connectible to said fluid supply, and a second opening in said second annular chamber whereby fluid is conductible via said first duct to said first annular chamber for applying radial forces between said shrink fit connection to release said members, and fluid is conductible via said second duct to said second chamber for applying both radial and axial forces between said two members for separating same, at least one of said adjacent surfaces at said transitional area also having an annular groove therein forming part of said second annular chamber.

3. For use with a supply of pressurized fluid, a pair of cylinder and shaft members respectively having inner and outer first circumferential surfaces for contact in a shrink fit, at least one of said surfaces formed to define an annular space therebetween, and the shaft including a first duct connecting said annular space with a first inlet, said cylinder and shaft members respectively having inner and outer second circumferential surfaces having diameters corresponding to define a clearance space between them, and also means disposed in said clearance space forming a seal between said members, each of said members having a transitional area between the first and second surfaces thereof defined by a stepped portion, the two transitional areas defining a second annular space therebetween, this second space defined by axially spaced end-surfaces and radially spaced side-surfaces, at least one end-surface of one member being adjacent a corresponding end-surface of the other member, the shaft having a second duct connecting said second annular space with a second inlet, whereby fluid is conductible via said first duct to said first annular chamber for applying radial forces between said shrink fit connection to release said members, and fluid is conductible via said second duct to said second chamber for applying both radial and axial forces between said two members for separating them at least one of said members at said stepped portion having an annular groove therein forming part of said second annular space.

4. For use with a supply of pressurized fluid, a pair of cylinder and shaft members respectively having inner and outer first circumferential surfaces for contact in a shrink fit, at least one of said surfaces formed to define an annular space therebetween, and the shaft including a first duct connecting said annular space with a first inlet, the diameter of said first surfaces being substantially equal on both sides axially of said first annular space, said cylinder and shaft members respectively having inner and outer second circumferential surfaces having diameters corresponding to define a clearance space between them, and also means disposed in said clearance space forming a seal between said members, each of said members having a transitional area between the first and second surfaces thereof, the two transitional areas defining a second annular space therebetween, said cylinder further including in its transitional area on the outer circumference thereof an annular recess whereby the cylinder wall thickness in the transitional area is thinner than in said first part, the shaft having a second duct connecting said second annular space with a second inlet, whereby fluid is conductible via said first duct to said first annular chamber for applying radial forces between said shrink fit connection to release said members, and fluid is conductible via said second duct to said second chamber for applying both radial and axial forces between said two members for separating same.

* * * * *